United States Patent
Takagi (10) Patent No.: US 7,221,919 B2
(45) Date of Patent: May 22, 2007

(54) RECEIVER CIRCUIT AND RADIO COMMUNICATION TERMINAL APPARATUS

(75) Inventor: Kotaro Takagi, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 170 days.

(21) Appl. No.: 10/509,889

(22) PCT Filed: Feb. 12, 2004

(86) PCT No.: PCT/JP2004/001487

§ 371 (c)(1),
(2), (4) Date: Oct. 1, 2004

(87) PCT Pub. No.: WO2004/073190

PCT Pub. Date: Aug. 26, 2004

(65) Prior Publication Data

US 2005/0255825 A1      Nov. 17, 2005

(30) Foreign Application Priority Data

Feb. 12, 2003    (JP)    ............................. 2003-033258

(51) Int. Cl.
*H04B 1/06* (2006.01)
(52) U.S. Cl. ............... 455/253.2; 455/296; 455/326; 455/251.1; 375/319; 375/147
(58) Field of Classification Search ......... 455/296, 455/326, 251.1, 253.2; 375/147, 319
See application file for complete search history.

(56) References Cited

U.S. PATENT DOCUMENTS

| 5,724,653 | A | * | 3/1998 | Baker et al. ............... 455/296 |
| 6,073,002 | A | * | 6/2000 | Peterson .................... 455/326 |
| 6,757,340 | B1 | * | 6/2004 | Jakobsson .................. 375/319 |
| 6,987,966 | B1 | * | 1/2006 | Wu et al. ................... 455/420 |
| 2002/0094788 | A1 | * | 7/2002 | Hayashi et al. .............. 455/73 |
| 2004/0097212 | A1 | * | 5/2004 | Matsumoto et al. ......... 455/296 |
| 2004/0203472 | A1 | * | 10/2004 | Chien ........................ 455/68 |

FOREIGN PATENT DOCUMENTS

| JP | 2002-335182 | 11/2002 |
| WO | 2001/95485 | 12/2001 |

\* cited by examiner

*Primary Examiner*—Edan Orgad
*Assistant Examiner*—Junpeng Chen
(74) *Attorney, Agent, or Firm*—Oblon, Spivak, McClelland, Maier & Neustadt, P.C.

(57) ABSTRACT

There are provided, as a low noise amplifier (70) a low noise amplifier (71) with a low gain and a low noise amplifier (72) with a high gain, selectively operable under control of a bias current, and an output from the low noise amplifier (72) and a quadrature demodulator (80) are connected with a serial capacitance (73) and also an output from the low noise amplifier (71) and the quadrature demodulator (80) are serially connected. A control section (66) controls a reception circuit so that the low noise amplifier (71) operates when a reception signal level is high and the low noise amplifier (72) operates when the reception signal level is low. When the low noise amplifier (72) operates, a DC bias current thereof is made flow separately from a DC bias current of the quadrature demodulator (80), and, when the low noise amplifier (71) operates, a DC bias current thereof is shared with the quadrature demodulator.

12 Claims, 9 Drawing Sheets

Fig.1

RELATED ART

Fig.2A

Fig.2B $g(t) = a_0 + a_1 f(t) \sin \omega_{TX} t + a_2 (f(t) \sin \omega_{TX} t)^2 + \ldots$
$= a_0 + a_1 f(t) \sin \omega_{TX} t + a_2 (f^2(t) (1 - \sin 2\omega_{TX} t)) + \ldots$

RECEIVER CIRCUIT AND RADIO COMMUNICATION TERMINAL APPARATUS

TECHNICAL FIELD

The present invention relates to a wireless communication terminal apparatus and its reception circuit, and particularly, to a reception system RF chip for a digital wireless communication terminal.

BACKGROUND ART

Figure 1:
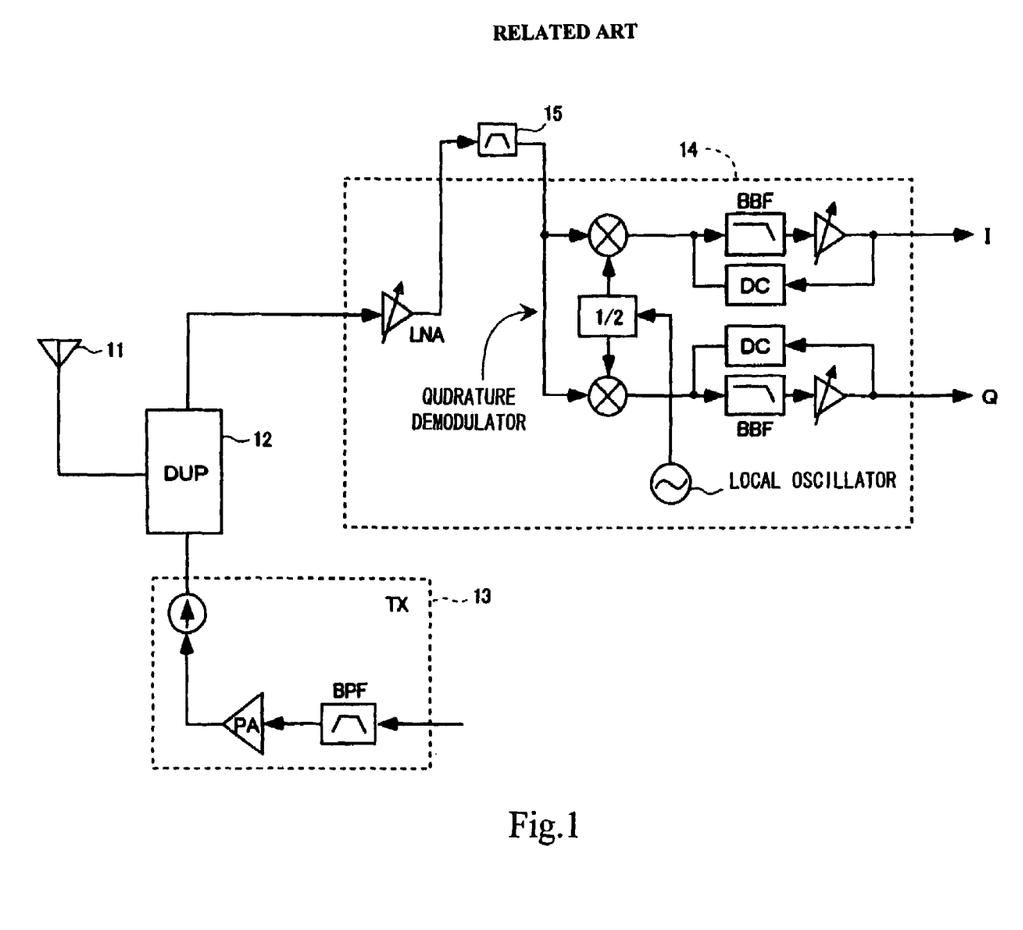
FIG. 1 is a block diagram showing the configuration of a portion of a wireless communication terminal including a conventional direct conversion receiver (DCR) that relates to the present invention.

FIG. 1 shows a configuration of a portion of a wireless communication terminal including a conventional direct conversion receiver (DCR) that relates to the present invention. In this configuration, especially, in a communication system using Code Division Multiple Access (CDMA) represented by a third generation mobile phone (3G), since a reception (RX) signal and a transmission (TX) signal having different frequencies are simultaneously input and output, the local TX signal is leaked to the RX side to degrade reception characteristics. To solve this problem, it is necessary to improve isolation characteristics from a transmission circuit 13 to a reception circuit (RX Chip) 14 in a duplexer (DUP) 12, and it is necessary to insert a band pass filter (BPF) 15 between a low noise amplifier (LNA) and a quadrature demodulator (Quad_Mixer) to suppress a signal level in a TX band.

On the other hand, when a desired reception signal level is high, the interference due to the TX leakage mentioned above can be ignored, but on the contrary, circuit saturation caused by the desired signal presents a problem. Thus, it is necessary to reduce the level of a signal input to circuits after the quadrature demodulator by reducing the gain of the LNA only when the desired reception signal level is high or by passing through the LNA.

In the DCR system as described above, the BPF 15 must be inserted in order to prevent the TX signal from being leaked and input to the quadrature demodulator and thereafter. Typically, the reception circuit 14 is formed of an IC (Integrated Circuit) chip. In contrast, since a SAW filter is used for the BPF, the BPF 15 is an external part which conflicts with the needs for saved space and a reduced number of parts which the DCR intends to realize. To take advantage of merits of the DCR, degraded reception characteristics due to the leaked TX signal must be avoided without using this BPF.

Figure 2A:
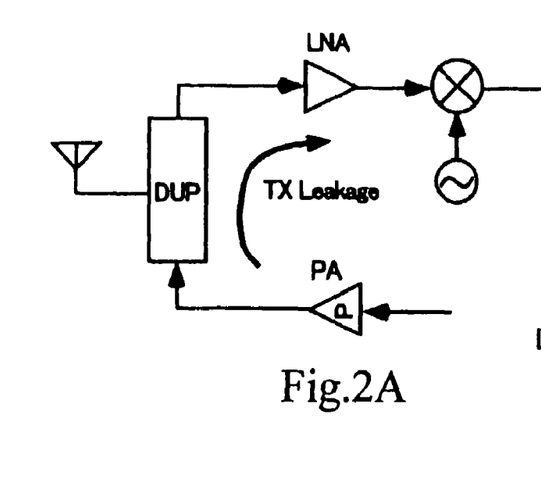
FIGS. 2A to 2C are diagrams for explaining degradation of reception characteristics due to second-order distortion in the conventional direct conversion receiver.
Figure 2B:
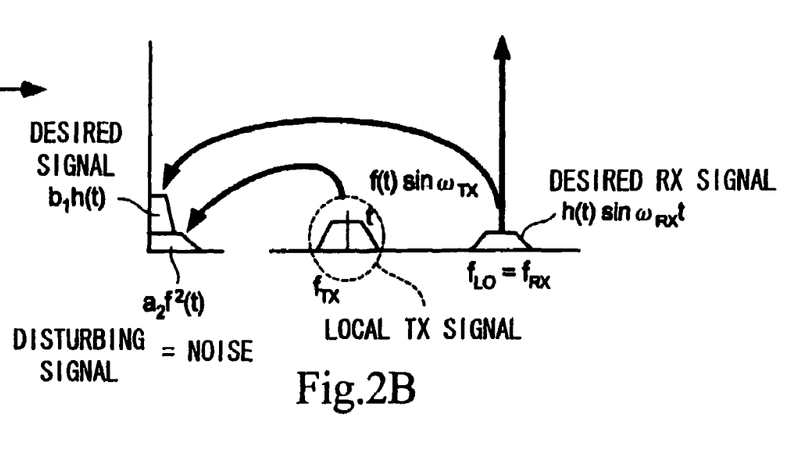
Figure 2C:
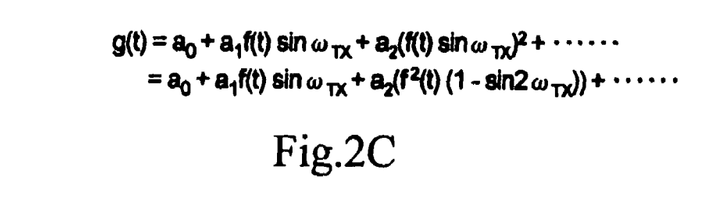

More specifically, as shown in FIG. 2A, when the TX signal is leaked and is input to the LNA and the quadrature demodulator, second-order distortion of a CDMA modulated signal directly lies on a baseband signal as shown in FIG. 2B. Since this serves as noise for a desired signal, it leads to a reduced C/N. It should be noted that, in an expression of FIG. 2C, f(t) represents a local TX modulated signal, $\sin\omega_{TX}$ represents a TX carrier, $a_0$ represents a DC offset, $a_1$ represents an LNA gain, $a_2 \ldots a_n$ represent coefficients of n-th order harmonic distortion, respectively, and g(t) represents an output signal of the LNA.

Figure 3:
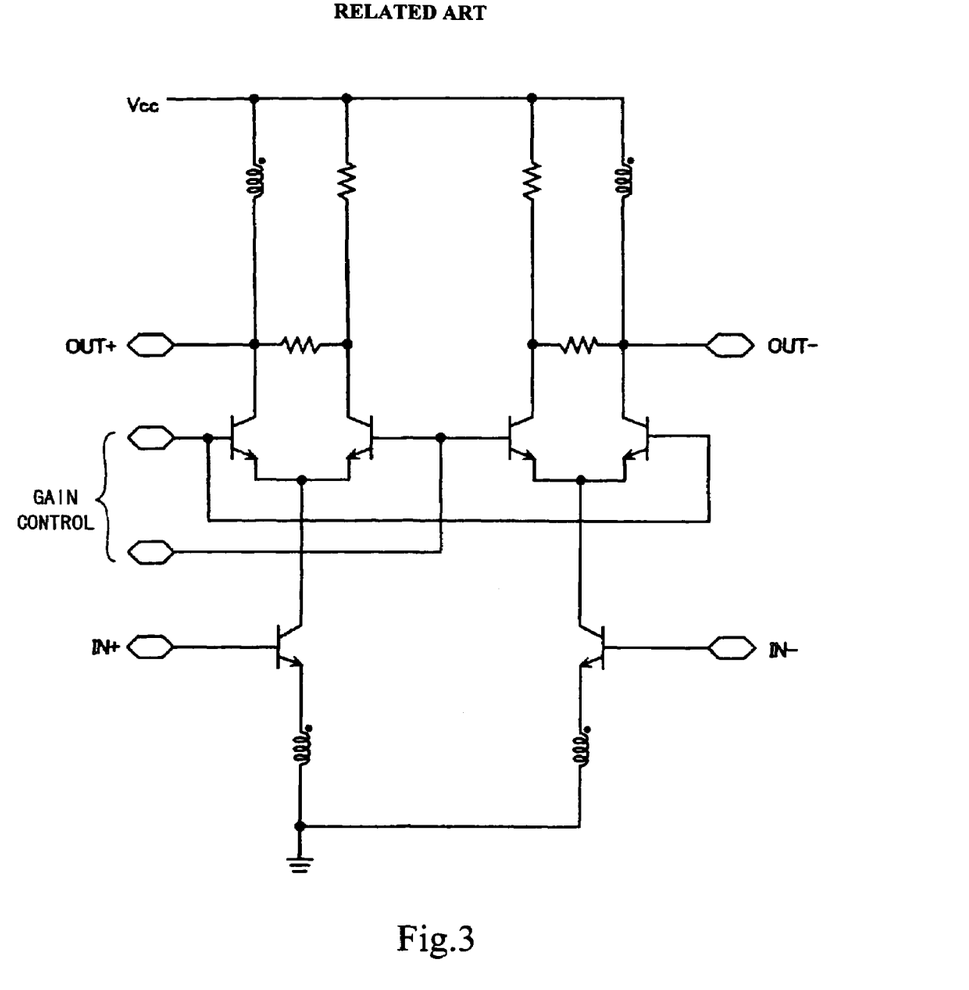
FIG. 3 is a circuit diagram showing an example of a gain controlled differential LNA circuit.

It is also contemplated that, in a case where a desired signal input is high, gain switching of the LNA is performed by a gain controlled differential LNA circuit as shown in FIG. 3. In this case, there is a problem that, although the level of a signal input to a later stage is reduced, high input tolerance of the LNA itself (such as IIP3 (3 order Input Intercept Point)) is not improved.

Figure 4:
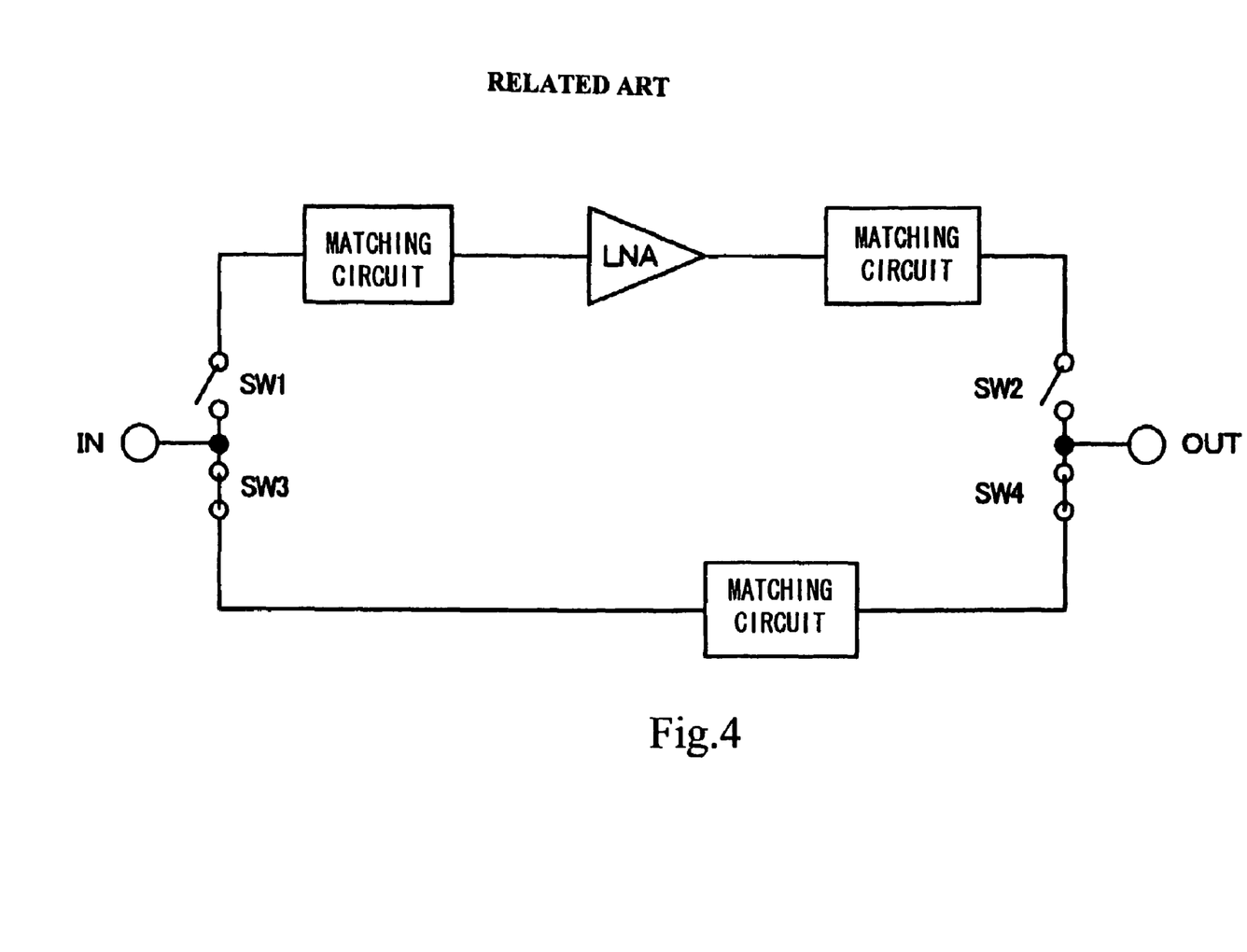
FIG. 4 is a circuit diagram showing an example of an LNA gain switching circuit of an input/output through type.

With an input/output through type LNA gain switching circuit as shown in FIG. 4, switches SW1 to SW4 can be switched in accordance with the intensity of a desired signal input to pass an input or an output of the LNA through when the desired signal input is high. However, in this circuit scheme, there is a problem that, since the input is only attenuated, a high gain is not provided and gain arrangement has no flexibility. Specifically, a through path in which the switches SW3 and SW4 are turned on includes an insertion loss of the switch and a mismatching loss of a matching circuit, and this configuration has no active circuit and thus a positive gain cannot be provided.

The present invention has been made in view of such a background, and it is an object thereof to provide a reception circuit which has favorable reception characteristics and high input tolerance of a low noise amplifier and can provide flexibility for gain arrangement of an LNA, and a wireless communication terminal using the same.

DISCLOSURE OF THE INVENTION

A reception circuit of the present invention is characterized by having a low noise amplifier having a low noise amplifying circuit with a low gain and a low noise amplifying circuit with a high gain which are capable of selective operation in accordance with control of a bias current, and a quadrature demodulator connected with a serial capacitance to an output of the above-mentioned low noise amplifying circuit with the high gain of the above-mentioned low noise amplifier and directly connected to an output of the above-mentioned low noise amplifying circuit with the low gain.

When the low noise amplifying circuit with the high gain is selected for operation, the output of the low noise amplifier with the high gain is connected with the serial capacitance to the quadrature demodulator, so that a second-order distortion component produced in the low noise amplifier is removed not to be input to the quadrature demodulator.

In this reception circuit, it is preferable that, during operation of the above-mentioned low noise amplifying circuit with the high gain, its DC bias current is passed independently of a DC bias current of the above-mentioned quadrature demodulator, and during operation of the above-mentioned low noise amplifying circuit with the low gain, its DC bias current is shared with a DC bias current of the above-mentioned quadrature demodulator. Thus, consumed power in the reception circuit is reduced when the low noise amplifying circuit with the low gain is selected for operation.

In the above-mentioned reception circuit, it is possible to provide a configuration in which each of the above-mentioned low noise amplifying circuit with the high gain and the above-mentioned low noise amplifying circuit with the low gain has a pair of differentially connected transistors, a first and a second inductive elements are connected in series between emitters of the pair of transistors in the above-mentioned low noise amplifying circuit with the low gain, and both ends thereof are connected to emitters of the pair of transistors in the above-mentioned low noise amplifying circuit with the high gain through a third and a fourth inductive elements, respectively. Thus, the differential inductive element of the one low noise amplifying circuit with a different gain can be shared as part of the inductive elements of the other low noise amplifying circuit.

It is possible to provide a configuration in which the above-mentioned first to fourth inductive elements are formed of a single inductor in which a spiral is smaller helically from a first terminal in an outermost portion and then the spiral is larger through gaps of the helicity, and returns to a second terminal in the outermost portion, and a third and a fourth terminals are drawn from two positions in the middle between an innermost portion of the inductor and the above-mentioned first and second terminals, a fifth terminal is drawn from a position in the innermost portion, the above-mentioned first and second terminals are connected to the emitters of the pair of transistors in the above-mentioned low noise amplifying circuit with the low gain, the above-mentioned third and fourth terminals are connected to the emitters of the pair of transistors in the above-mentioned low noise amplifying circuit with the high gain, and the above-mentioned fifth terminal is grounded through a resistance. Thus, the area occupied by the first to fourth inductive elements is reduced when the reception circuit is formed as an IC chip.

A wireless communication terminal apparatus of the present invention is characterized by having a low noise amplifier having a low noise amplifying circuit with a low gain and a low noise amplifying circuit with a high gain which are capable of selective operation in accordance with control of a bias current, a quadrature demodulator connected with a serial capacitance to an output of the above-mentioned low noise amplifying circuit with the high gain of the above-mentioned low noise amplifier and directly connected to an output of the above-mentioned low noise amplifying circuit with the low gain, a reception level detecting means for detecting a level of a reception signal, and a control means for performing control of the above-mentioned reception circuit in accordance with an output of the above-mentioned reception level detecting means, wherein the above-mentioned control means controls the above-mentioned low noise amplifier such that it operates the low noise amplifying circuit with the low gain when the above-mentioned reception signal level is high, and operates the low noise amplifying circuit with the high gain as the above-mentioned low noise amplifier when the above-mentioned reception signal level is low.

With this configuration, in a state in which it is close to a base station, that is, when a reception signal level is higher than a predetermined level, the LNA is set to the low gain to realize low power consumption. If the reception signal predetermined level with which the LNA is switched to the low gain is set to be equal to or lower than average reception power of the terminal, average power consumption of the terminal is reduced. In addition, in a state in which the wireless communication terminal is far from a base station, that is, when a reception signal level is lower than the predetermined level, the LNA is set to the high gain, and in this event, the LNA is coupled with a direct capacitance to the quadrature demodulator, thereby making it possible to remove a second-order distortion component produced in the LNA to prevent it from being input to the quadrature demodulator.

Since the LNA is at least AC direct coupled (DC direct coupled at the time of the low gain) to the quadrature demodulator, the whole reception circuit can be formed as an IC chip and the merits of the DCR can be used.

In addition, the first to fourth inductive elements in the two LNA with different gains are formed of the single symmetrical type inductor to allow saving of the area occupied by the inductive elements on the chip. As a result, a die size becomes reduced and a chip unit price becomes lower.

BEST MODE FOR CARRYING OUT THE INVENTION

In the following, an embodiment of the present invention will be described in detail with reference to the drawings.

Figure 5:
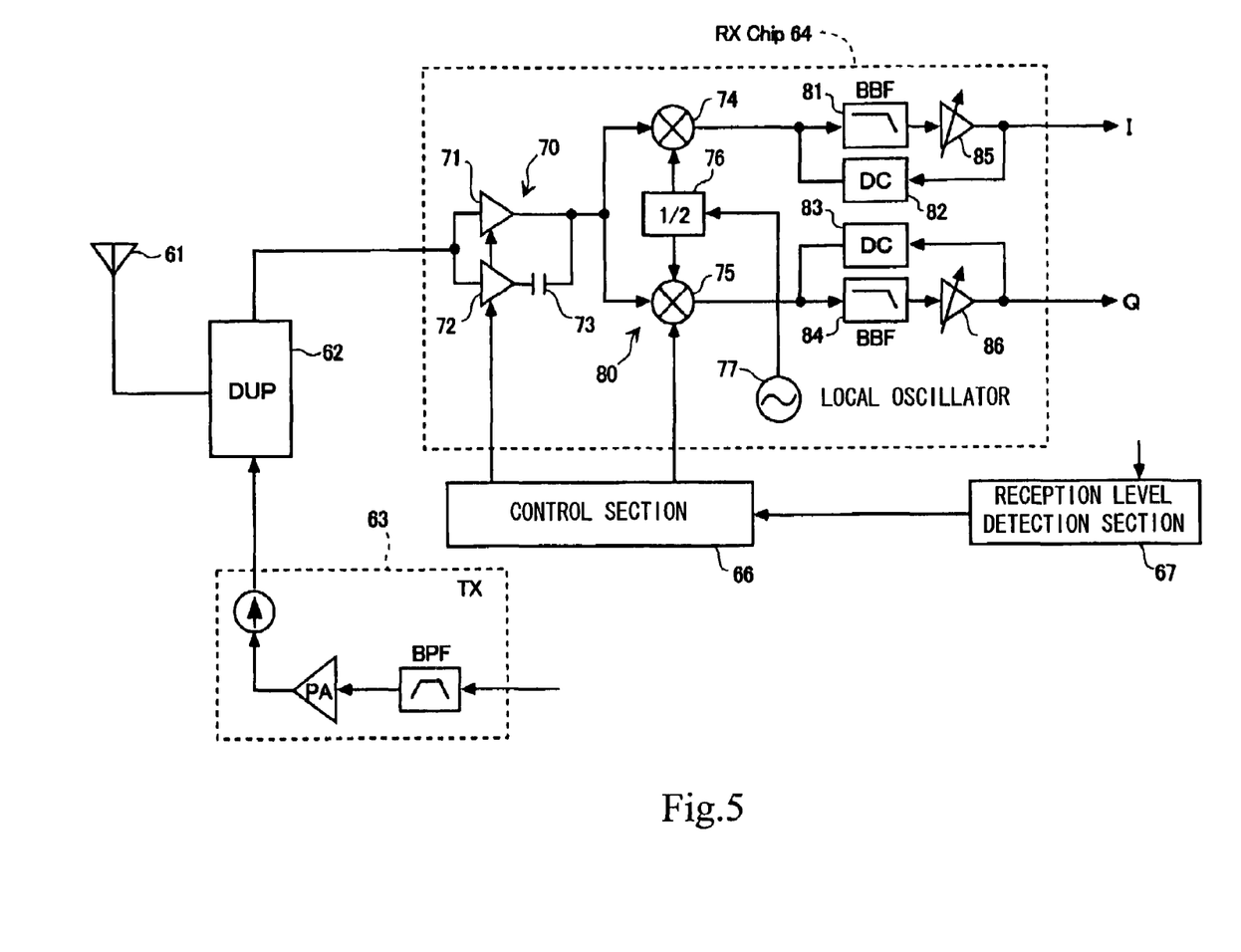
FIG. 5 is a block diagram showing a configuration example of a portion of a digital wireless communication terminal including a direct conversion receiver (DCR) according to an embodiment of the present invention that relates to the present invention.

FIG. 5 shows an example of a configuration of a part of a digital wireless communication terminal containing a direct conversion receiver (DCR) suitable for a wireless communication system using Code Division Multiple Access (CDMA) that relates to the present invention.

This wireless communication terminal has a transmission circuit 63, a reception circuit 64, an antenna 61, a duplexer 62 for sharing the antenna between transmission and reception, a reception level detection section 67 which detects a reception signal level, and a control section 66 which controls the operation of the reception circuit 64 based on an output from the reception level detection section 67.

The reception circuit 64 is formed of an IC chip, and has two LNAs 71 and 72 having different gains, a capacitor 73 connected in series to an output of the LNA 72, a quadrature demodulator 80 which demodulates an output of an LNA 70, a local oscillator 77, baseband filters (BBF) 81 and 84, DC offset compensation circuits 82 and 83, and amplifiers 85 and 86. The quadrature demodulator 80 has mixers 74 and 75 for an I channel and a Q channel, respectively, and a phase shifter 76 which receives transmitted signals of the local oscillator 77 and supplies signals with a predetermined phase difference to the mixers 74 and 75.

Figure 6A:
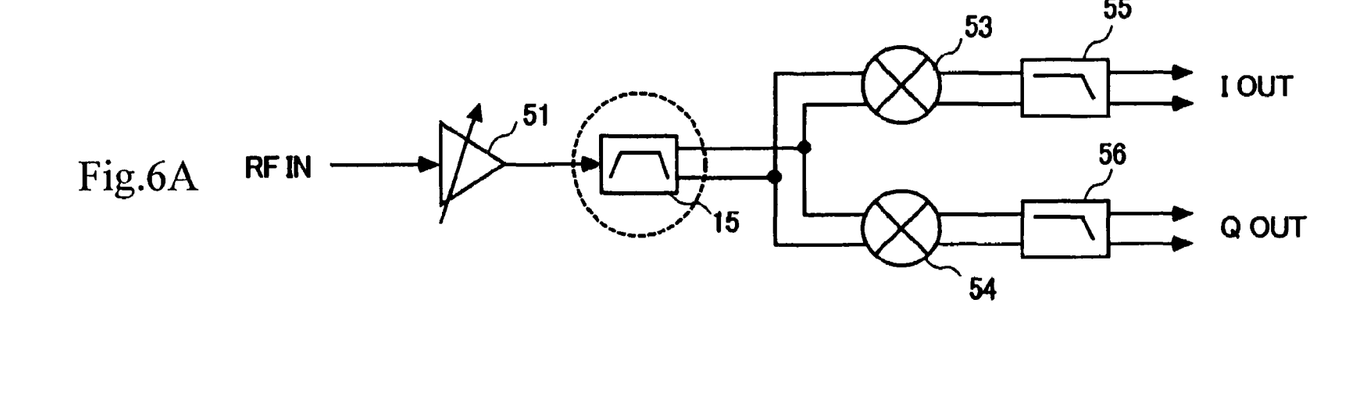
FIGS. 6A and 6B are diagrams showing extracted schematic configurations of a conventional direct conversion receiver and the direct conversion receiver of the embodiment, respectively.
Figure 6B:
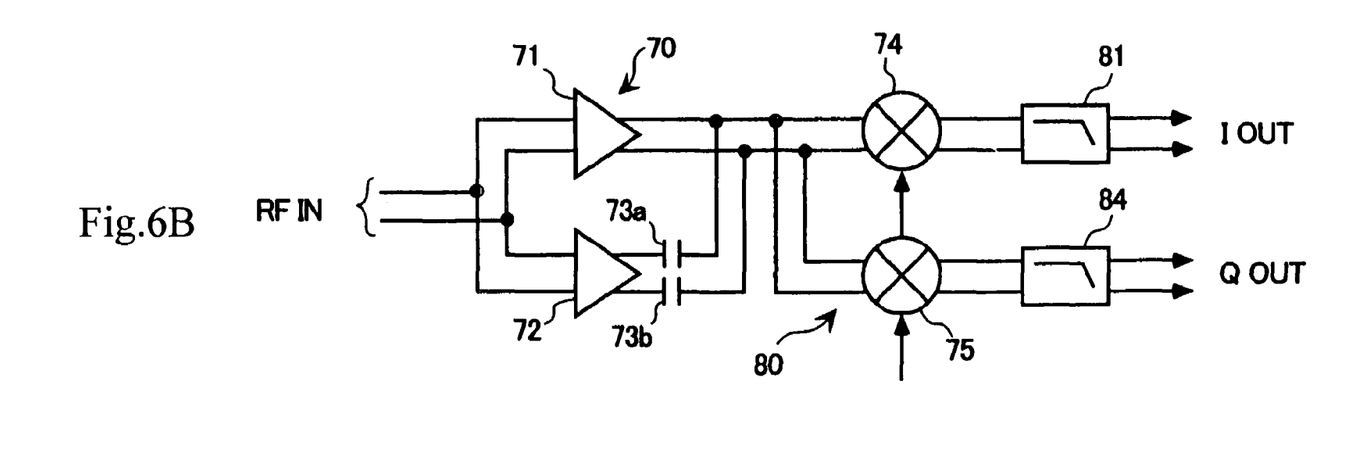

FIGS. 6A and 6B show the extracted schematic configurations of a conventional direct conversion receiver and the direct conversion receiver of the embodiment, respectively. In the conventional configuration of FIG. 6A, an LNA 51 is connected to a quadrature demodulator (including respective mixers 53 and 54 for I-ch and Q-ch) by an off-chip BPF. However, in the embodiment of FIG. 6B, an off-chip BPF is not required, and the LNA (including the LNAs 71 and 72) is directly connected to the quadrature demodulator 80 (including the respective mixers 74 and 75 for I-ch and Q-ch) within the IC chip (however, capacitors 73a and 73b serving as serial capacitances are inserted between the quadrature demodulator 80 and the LNA 72.) In addition, since a differential configuration is preferred for circuits within the reception circuit 14, the LNA 71 and 72 are changed from a single configuration to the differential configuration.

Figure 7:
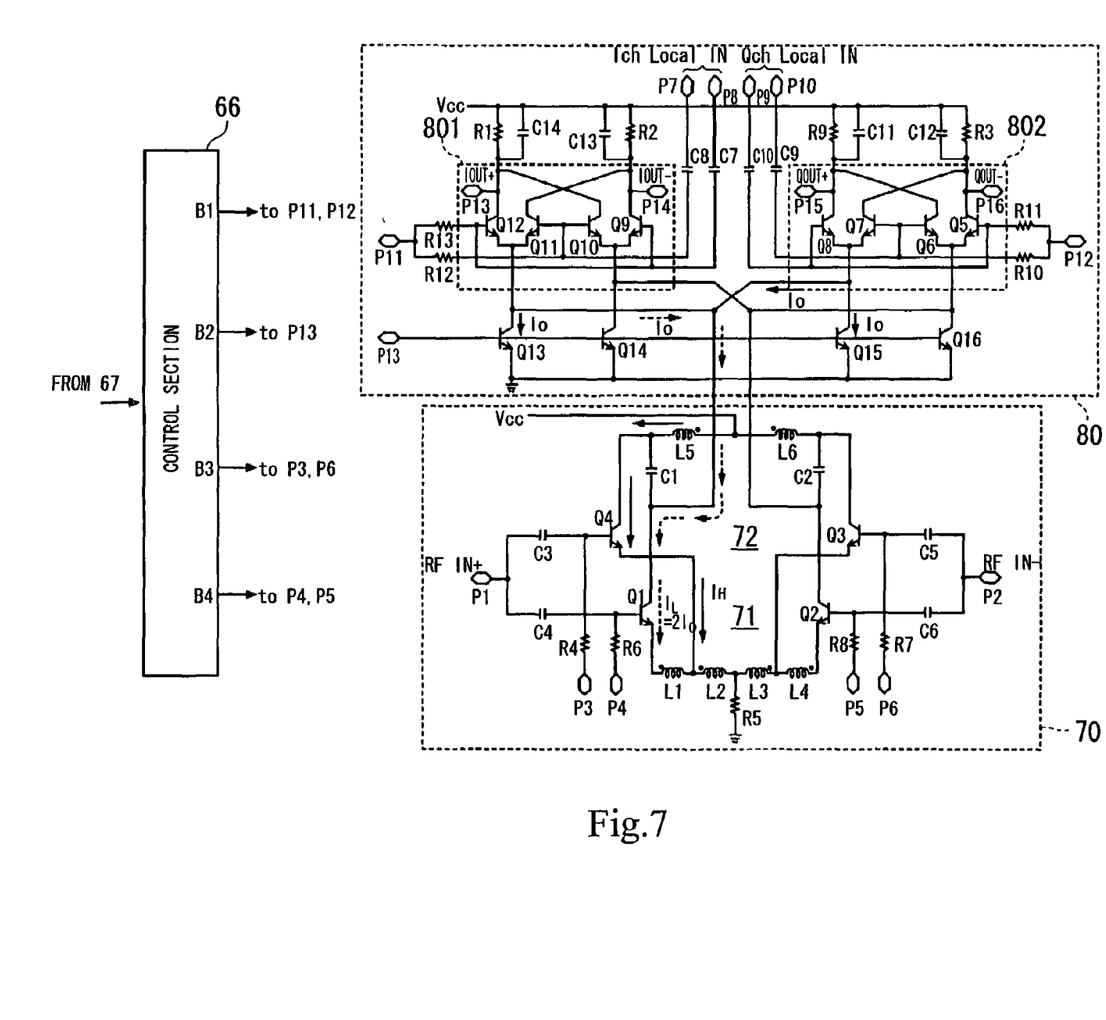
FIG. 7 is a circuit diagram showing an example of the specific circuit configuration of a low noise amplifier (LNA) and a quadrature demodulator together with the block of a control section.

FIG. 7 shows an example of the specific circuit configuration of the low noise amplifier (LNA) 70 and the quadrature demodulator 80 together with the block of the control section 66. The control section 66 is a circuit block which performs DC bias creation and control of the LNA 70 and the quadrature demodulator 80.

The LNA 70 is formed of the two differential amplifiers 71 and 72 controlled to selectively operate. The first differential amplifier 71 is formed of transistors Q1 and Q2, inductors (inductive elements) L1, L2, L3, and L4, capacitors C4 and C6, and resistors R6 and R8. Collectors of the transistors Q1 and Q2 are directly connected to the quadrature demodulator 80. The second differential amplifier 72 is formed of transistors Q4 and Q3, inductors L2 and L3, capacitors C3 and C5, and resistors R4 and R7. Collectors of the transistors Q4 and Q3 are connected to a power voltage Vcc through inductors L5 and L6, respectively, and connected to the quadrature demodulator 80 through capacitors C1 and C2 (corresponding to 73a and 73b in FIG. 6B). A reception signal RFIN+ is applied to each of bases of the transistors Q1 and Q4 through the capacitors C4 and C3, respectively, from a terminal P1. A reception signal RFIN− is applied to each of bases of the transistors Q2 and Q3 through the capacitors C6 and C5, respectively, from a terminal P2. The inductors L2 and L3 are shared between both the differential amplifiers 71 and 72, and a connection point between them is grounded through a resistor R5. The bases of the transistors Q1, Q2, Q3, and Q4 are connected to bias terminals P4, P5, P6, and P3 through the resistors R6, R8, R7 and R4, respectively. The terminals P3 and P6 are connected to a terminal B3 of the control section 66, and the terminals P4 and P5 are connected to a terminal B4 of the control section 66.

The quadrature demodulator 80 has two Gilbert Cells 801 and 802 for an I channel and a Q channel, respectively. The quadrature demodulator 80 is divided into parts for the I channel and the Q channel on the left and right of FIG. 7.

The Gilbert Cell 801 has a first differential pair of transistors Q11 and Q12 and a second differential pair of transistors Q10 and Q9. Emitters of the first differential pair of transistors Q11 and Q12 are directly coupled and connected to a collector of a transistor Q13 forming a current source and a collector of the transistor Q1 of the aforementioned LNA 70. Emitters of the second differential pair of transistors Q10 and Q9 are directly coupled and connected to a collector of a transistor Q14 forming a current source and a connector of the transistor Q2 of the aforementioned LNA 70. Bases of the first differential pair of transistors Q9 and Q12 are connected to a terminal P11 through a resistor R13, and this terminal P11 is connected to the terminal B1 of the control section 66. Bases of the second differential pair of transistors Q10 and Q11 are connected to the terminal P11 through a resistor R12. Bases of the transistors Q10 and Q11 are connected to a terminal P7 through a capacitor C8, and bases of the transistors Q9 and Q12 are connected to a terminal P8 through a capacitor C7. A local transmission signal (I-ch Local IN) of the I channel is input to the terminals P7 and P8. In addition, collectors of the transistors Q10 and Q12 are connected to the power voltage Vcc through a resistor R1 and a capacitor C14 connected in parallel. Collectors of the transistors Q9 and Q11 are connected to the power voltage Vcc through a resistor R2 and a capacitor C13 connected in parallel. The collectors of the transistors Q10 and Q12 are connected to a terminal P13, from which an IOUT+ signal is output. The collectors of the transistors Q9 and Q11 are connected to a terminal P14, from which an IOUT− signal is output.

Similarly, the Gilbert Cell 802 has a third differential pair of transistors Q7 and Q8 and a fourth differential pair of transistors Q6 and Q5. Emitters of the third differential pair of transistors Q7 and Q8 are directly coupled and connected to a collector of a transistor Q15 forming a current source and the collector of the transistor Q1 of the aforementioned LNA 70. Emitters of the fourth differential pair of transistors Q6 and Q5 are directly coupled and connected to a collector of a transistor Q16 forming a current source and the collector of the transistor Q2 of the aforementioned LNA 70. Bases of the third differential pair of transistors Q7 and Q6 are connected to the terminal P11 through the resistor R10, and this terminal P12 is connected to the terminal B1 of the control section 66. Bases of the fourth differential pair of transistors Q8 and Q5 are connected to a terminal P12 through a resistor R11. The bases of the transistors Q6 and Q7 are connected to a terminal P10 through a capacitor C9, and the bases of the transistors Q5 and Q8 are connected to a terminal P9 through a capacitor C10. A local transmission signal (Q-ch Local IN) for the Q channel is input to the terminals P10 and P9. In addition, collectors of the transistors Q6 and Q8 are connected to the power voltage Vcc through a resistor R9 and a capacitor C11 connected in parallel. Collectors of the transistors Q5 and Q7 are connected to the power voltage Vcc through a resistor R3 and a capacitor C12 connected in parallel. The collectors of the transistors Q6 and Q8 are connected to a terminal P15, from which a QOUT+ signal is output. The collectors of the transistors Q5 and Q7 are connected to a terminal P16, from which a QOUT− signal is output.

Transistors Q13, Q14, Q15, and Q16 each forming the current source constitute a current mirror circuit together with circuitry within the control section 66, and the terminal P13 connected to the bases of the respective transistors is connected to the terminal B2 of the control section 66.

Next, the operation of the circuits in FIG. 7 is described.

[1] A Case Where a Desired Reception Signal Level is Low

The reception level detection section 67 (FIG. 5) is performing signal level measurement with a baseband (BB). In response to an output from the reception level detection section 67, the control section 66 outputs a control signal for increasing a gain to the LNA 70 in a case where the signal level is low. Specifically, a reference current source circuit (not shown) for a current mirror connected to the terminal B3 within the control section 66 is turned on, and a reference current source circuit (not shown) for a current mirror connected to the terminal B4 is turned off. As a result, the current mirror reference current source circuit within the control section 66 and the transistors Q3 and Q4 through the terminal B3 and the terminals P3 and P6 constitute a current mirror circuit, and a desired bias current $I_H$ passes through the LNA 72. This current is supplied from the Vcc through the inductors L5 and L6. (Direct current display in FIG. 7 is only display of one channel of the differential.) The transistors Q3 and Q4 simultaneously operate as amplifying elements of the LNA, and convert an RF signal voltage input to the terminals P1 and P2 into a current and amplify it.

Similarly, in the case where the signal level is low, the reference current source circuit for a current mirror (not shown) connected to the terminal B4 within the control section 66 is turned off, so that no current passes through the transistors Q1 and Q2 connected through the terminals P4 and P5, and the LNA circuit 71 formed by these transistors does not operate. In addition, simultaneously, the reference current source circuit for a current mirror (not shown) connected to the terminal B2 within the control section 66 connected to the terminal B2 is turned on, and a current mirror formed by connecting this circuit to each transistor of the transistors Q13 to Q16 through the terminal P13 operates, and the four transistors of the transistors Q13 to Q16 operate as constant current sources of the same configuration. On the other hand, since a constant voltage compensated for temperature is supplied from the terminal B1 through the terminals P11 and P12, a bias current $2I_0$ passes through the two Gilbert Cell circuits formed by the transistors Q5 to Q12.

In this state, the LNA 72 formed by the transistors Q3 and Q4 must have a high gain. Thus, voltage negative feedback inductors (degeneration inductors) L2 and L3 connected in series to emitters of the transistors Q3 and Q4 are set to values such that the LNA can maintain favorable third-order distortion characteristics and provide a high gain. In addition, the inductors L5 and L6 serve as loads in terms of AC, and form a resonance circuit together with a parallel capacitance formed by a capacitance Ccs on the collector side of the transistors Q4 and Q3 and an input capacitance of the quadrature demodulator. The values of the inductors L5 and L6 are determined such that the resonance frequency of the resonance circuit matches an RX reception frequency.

Figure 8:
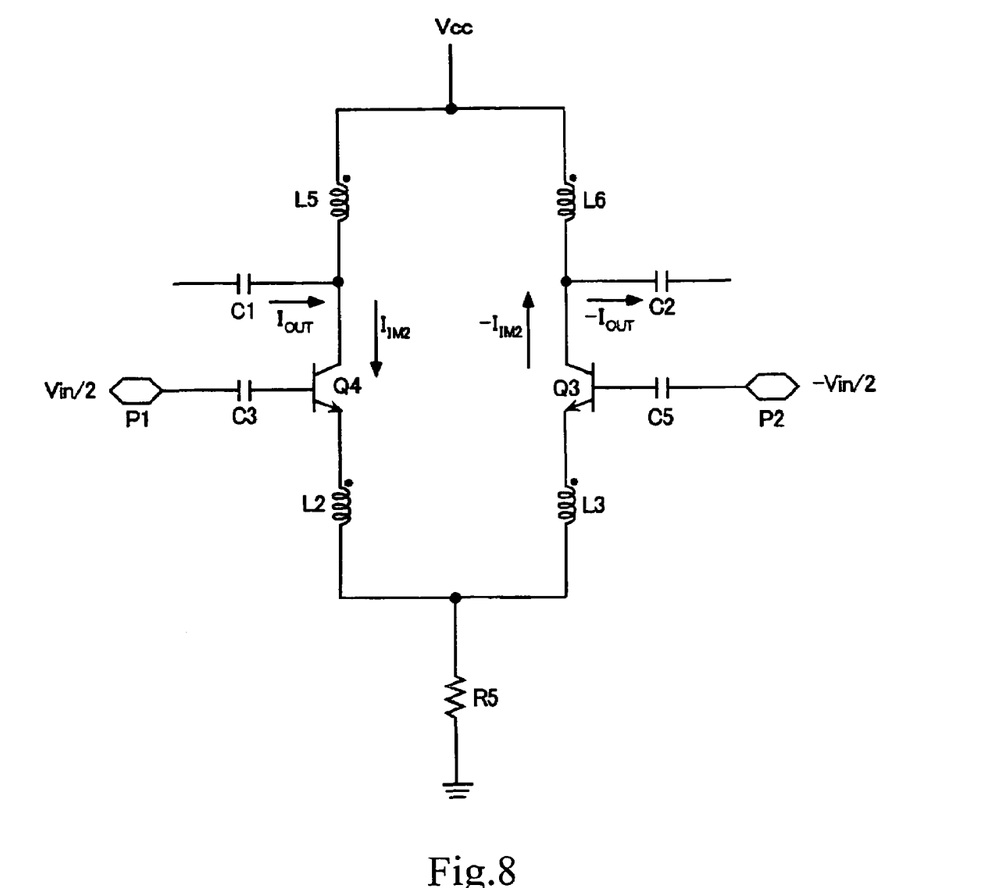
FIG. 8 is an explanatory diagram for a second-order distortion current produced in the LNA (especially an LNA 72) in the circuit of FIG. 7.

In addition, in this state, since a terminal is generally at a position far from a base station, local transmission power is set to be high such that up-channel information is sufficiently transmitted. In other words, it is in a state in which a desired RX signal shown in FIG. 2B is low and a local TX signal is high. Thus, it is expected that a ratio between folding noise of a second-order distortion component of TX to the BB band and a BB signal component of a desired signal (a power ratio of $a_2 f^2(t)$ and $b_1 h(t)$) is reduced. With FIG. 8, description is made for a second-order distortion current produced in the LNA (especially, the LNA 72 including Q3 and Q4). Here, the second-order distortion component of the local TX signal is represented by a square function of a BB signal of TX. Specifically, when $Vin/2=f(t)\sin\omega_{TX}$, the second-order distortion component $I_{IM2}$ is as follows:

$$I_{IM2}=gm_2 f^2(t)$$

where $gm_2$ is equivalent to the aforementioned $a_2$. Since f(t) is a base band signal and has a frequency sufficiently lower than an RF signal, it can be cut by the capacitors C1 and C2 in FIG. 8. Thus, the amount by which the second-order distortion noise of TX overlaps the reception BB signal is reduced. On the other hand, since the desired RX signal is a signal in an RF band, an RX signal amplified by the transistors Q3 and Q4 is supplied to the quadrature demodulation circuit 80 in the next stage through the capacitors C1 and C2.

It should be noted that, in this operation state, DC bias currents passing through the LNA 70 and the quadrature demodulator 80 are $2I_H$ and $4I_0$, and a total current is $2I_H+4I_0$.

[2] A Case Where a Desired Reception Signal Level is at a High Level, Equal to or Higher than a Certain Level In a case where a signal level is high equal to or higher than a certain predetermined value, in response to an output from the reception level detection section 67, the control section 66 outputs a control signal for reducing the gain of the LNA 70 to the LNA 70. Specifically, in the control section 66, while the reference current source circuit for a current mirror inside connected to the terminal B4 is turned on, the reference current source circuit for a current mirror connected to the terminal B3 is turned off. As a result, the current mirror reference current source circuit within the control section 66 and circuitry formed of the transistors Q1 and Q2 through the terminals P4 and P5 from the B4 terminal constitute a current mirror circuit, and a desired bias current, as later described, passes through it. On the other hand, at this point, in the quadrature demodulator 80, a reference current source circuit for a current mirror inside connected to the terminal B2 is turned off, and a current mirror circuit formed by connecting it to the transistors Q13 to Q16 through the terminal P13 does not operate, so that the four transistors Q13 to Q16 are turned off, and no DC current passes through. However, the collectors of the transistors Q1 and Q2 of the LNA 71 in the operation state are connected as DC to the two Gilbert Cells 801 and 802 formed by the transistors Q5 to Q12 not through the capacitances of the capacitors C1 and C2, respectively, so that a DC bias current passes through these Gilbert Cell circuits with the transistors Q1 and Q2 for the LNA 71 as constant current sources. If the current mirror circuit formed by the reference current source circuit within the control section 66 and the transistors Q1 and Q2 is set such that a current of $2I_0$ passes through the transistors Q1 and Q2, respectively, a bias current necessary for the Gilbert Cell circuits can be passed through.

In addition, the transistors Q1 and Q2 operate as differential LNAs driven by the DC bias current of $2I_0$, and convert an RF signal voltage input to the terminals P1 and P2 into a current and amplify it. At this point, the inductors L5 and L6 inserted between the collectors of the transistors Q1 and Q2 through the capacitors C1 and C2 serve loads in terms of AC similarly to the case where the transistors Q3 and Q4 operate as the high gain LNA 72, and form a resonance circuit together with a parallel capacitance formed by the capacitance Ccs on the collector side and the input capacitance of the quadrature demodulator 80. As described above, the values of the inductors L5 and L6 are determined such that the reference frequency of this resonance circuit matches an RF reception frequency. In this state, the gain of the LNA 70 needs to be reduced (set to a low gain) to the extent that the LNA and the circuit in the next stage do not come into a saturation state even when the wireless communication terminal comes closest to the base station and the desired RX signal level is at the maximum. For this reason, inductors connected to emitters of the transistors Q1 and Q2 respectively need to have higher inductance than at the time of a high gain. Thus, connection of the inductors L1 and L4 directly to the inductors L2 and L3 at the time of a high gain, respectively, satisfies this requirement.

In this state, since the current mirror reference current source circuit within the control section 66 connected to the terminal B3 is turned off, no current passes through the transistors Q3 and Q4, and the LNA circuit 72 formed by these transistors does not operate.

In addition, since the terminal is at a position relatively close to the base station, uplink channel information can be transmitted even when transmission power is not increased. Specifically, since it is in a state in which a desired RX signal shown in FIG. 2B is high and a local TX signal is low, the ratio of folding noise of a second-order distortion component of TX to the BB band to a BB signal component of a desired signal (the power ratio of $a_2f^2(t)$ and $b_1h(t)$) is increased. Thus, it is not necessary in the LNA 71 for a low gain including the transistors Q1 and Q2 to remove a second-order distortion signal produced in the LNA with the capacitance coupling as in the high gain LNA 72, and the LNA 71 for a low gain can be directly connected to the quadrature demodulator 80 in a direct current manner.

In this operation state, DC bias currents passing through the LNA 70 and the quadrature demodulator 80 are $4I_0$ and $4I_0$, respectively, and the collectors of the transistors Q1 and Q2 of the LNA 71 are directly connected in a DC manner to the emitter sides of the eight transistors in the two Gilbert Cells 801 and 802 forming the quadrature modulator 80, so that a total current is $4I_0$. This is smaller than the setting at the time of a high gain by $I_H$, and it is apparent that saving of consumed power is possible.

Figure 9:
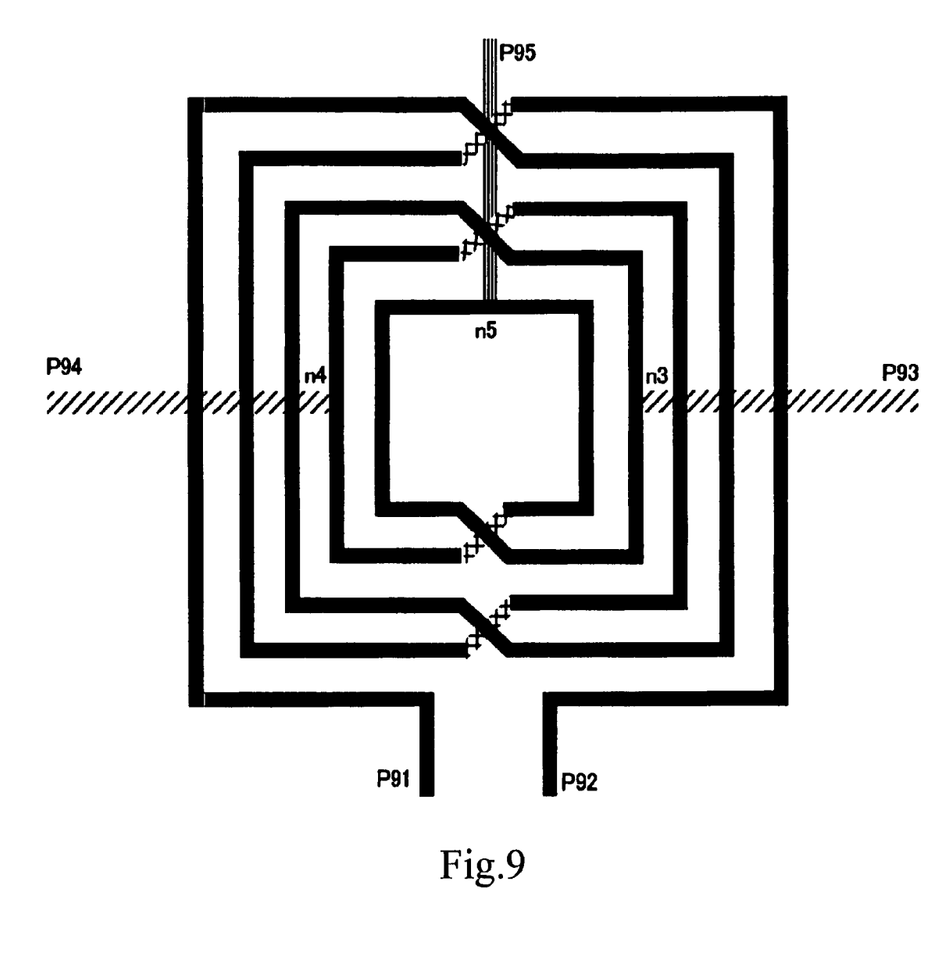
FIG. 9 is a diagram showing an example of inductors L1 to L4 shown in FIG. 7 formed of a single inductor (coil).

It should be noted that the inductors L1 to L4 can be formed of a single inductor (coil) as shown in FIG. 9. (In FIG. 9, a hatched line is for clearly showing the connection relationship with intersected lines, and has no meaning other than that.) In this inductor, a spiral is smaller helically from a terminal P91 and then the spiral is larger through gaps of the helicity, and finally, returns to a terminal P92 at a position adjacent to the terminal P91. This path is formed by a single helical conductive path which can be written in one stroke. A tap terminal is drawn from a predetermined position in such a path. Specifically, a tap terminal P95 is drawn from a position n5 at center of the innermost portion, and tap terminals P93 and P94 are drawn from positions (here, symmetrical positions n3 and n4 in a path immediately outside of to the center) in the middle between the position n5 and the outermost terminals P91 and P95, respectively. A portion from the terminal P91 to n3 serves as the inductor L1, a portion from n3 to n5 as the inductor L2, a portion from n5 to n4 as the inductor L3, and a portion from n4 to the terminal P92 as the inductor L4. Specifically, if the terminals P91 and P92 in FIG. 9 are connected to the emitters of the transistors Q1 and Q2 in FIG. 7, and the terminals P93 and P94 in FIG. 9 are connected to the emitters of the transistors Q3 and Q4 in FIG. 7, and P95 in FIG. 9 is connected to the hot side of the resistor R5, respectively, the four inductors L1 to L4 can be realized by the apparent signal inductor configuration. This reduces the area occupied by the inductors, and tapping from symmetrical positions of the horizontally symmetrical coil shape can easily match the paired inductor values (inductances).

While the preferred embodiment of the present invention has been described so far, various modifications and variations other than that described above are possible.

The invention claimed is:

1. A reception circuit comprising:
   a low noise amplifier having a low noise amplifying circuit with a low gain and a low noise amplifying circuit with a high gain which are capable of selective operation in accordance with control of a bias current; and
   a quadrature demodulator connected with a serial capacitance to an output of said low noise amplifying circuit with the high gain of said low noise amplifier and directly connected to an output of said low noise amplifying circuit with the low gain.

2. The reception circuit according to claim 1, wherein:
   during operation of said low noise amplifying circuit with the high gain, a DC bias current thereof is passed independently of a DC bias current of said quadrature demodulator, and
   during operation of said low noise amplifying circuit with the low gain, a DC bias current thereof is shared with the DC bias current of said quadrature demodulator.

3. The reception circuit according to claim 1, wherein:
   each of said low noise amplifying circuit with the high gain and said low noise amplifying circuit with the low gain has a pair of differentially connected transistors, and
   a first and a second inductive elements are connected in series between emitters of the pair of transistors in said low noise amplifying circuit with the low gain, and both ends thereof are connected to emitters of the pair of transistors in said low noise amplifying circuit with the high gain through a third and a fourth inductive elements, respectively.

4. The reception circuit according to claim 3, wherein:
   said first to fourth inductive elements are formed of a single inductor in which a spiral is smaller helically from a first terminal in an outermost portion and then the spiral is larger through gaps of the helicity, and returns to a second terminal in the outermost portion, and a third and a fourth terminals are drawn from two positions in the middle between an innermost portion of the inductor and said first and second terminals, a fifth terminal is drawn from a position in the innermost portion, said first and second terminals are connected to the emitters of the pair of transistors in said low noise amplifying circuit with the low gain, said third and fourth terminals are connected to the emitters of the pair of transistors in said low noise amplifying circuit with the high gain, and said fifth terminal is grounded through a resistance.

5. The reception circuit according to claim 3, wherein:
   said quadrature demodulator has two Gilbert Cell circuits for an I channel and a Q channel, respectively, and a current source for providing a current bias current for each of the Gilbert Cell circuits,
   a first Gilbert Cell circuit has a first differential pair of transistors and a second differential pair of transistors, emitters of the first differential pair of transistors are directly coupled to both said own current source and a collector of one of the low gain pair of transistors in said low noise amplifying circuit with current selectively flowing to said own current source during high gain or to a collector of one of the pair of low gain transistors in said low noise amplifying circuit during low gain, and emitters of the second differential pair of transistors are directly coupled to both said own current source and a collector of the other of the pair of low gain transistors in said low noise amplifying circuit with current selectively flowing to said own current source during high gain or to a collector of the other of the pair of low gain transistors in said low noise amplifying circuit during low gain, and
   a second Gilbert Cell circuit has a third differential pair of transistors and a fourth differential pair of transistors, emitters of the third differential pair of transistors are directly coupled to both said own current source and a collector of one of the pair of low gain transistors in said low noise amplifying circuit with current selectively flowing to said own current source during high gain or to a collector of one of the pair of low gain transistors in said low noise amplifying circuit during low gain, and emitters of the fourth differential pair of transistors are directly coupled to both said own current source and a collector of the other of the pair of low gain transistors in said low noise amplifying circuit with current selectively flowing to said own current source during high gain or to a collector of the other of the pair of low gain transistors in said low noise amplifying circuit during low gain.

6. The reception circuit according to claim 4, wherein said reception circuit includes an IC chip.

7. A wireless communication terminal apparatus comprising:
   a low noise amplifier having a low noise amplifying circuit with a low gain and a low noise amplifying circuit with a high gain which are capable of selective operation in accordance with control of a bias current;
   a quadrature demodulator connected with a serial capacitance to an output of said low noise amplifying circuit with the high gain of said low noise amplifier and directly connected to an output of said low noise amplifying circuit with the low gain;
   reception level detecting means for detecting a level of a reception signal; and
   control means for performing control of said reception circuit in accordance with an output of said reception level detecting means, characterized in that:
   said control means controls said low noise amplifier such that it operates the low noise amplifying circuit with the low gain when said reception signal level is high, and operates the low noise amplifying circuit with the high gain as said low noise amplifier when said reception signal level is low.

8. The wireless communication terminal apparatus according to claim 7, wherein:
   during operation of said low noise amplifying circuit with the high gain, a DC bias current thereof is passed independently of a DC bias current of said quadrature demodulator, and
   during operation of said low noise amplifying circuit with the low gain, a DC bias current thereof is shared with the DC bias current of said quadrature demodulator.

9. The wireless communication terminal apparatus according to claim 7, wherein:
   each of said low noise amplifying circuit with the high gain and said low noise amplifying circuit with the low gain has a pair of differentially connected transistors, and
   a first and a second inductive elements are connected in series between emitters of the pair of transistors in said low noise amplifying circuit with the low gain, and both ends thereof are connected to emitters of the pair of transistors in said low noise amplifying circuit with the high gain through a third and a fourth inductive elements, respectively.

10. The wireless communication terminal apparatus according to claim 9, wherein:
    said first to fourth inductive elements are formed of a single inductor in which a spiral is smaller helically from a first terminal in an outermost portion and then the spiral is larger through gaps of the helicity, and returns to a second terminal in the outermost portion, and a third and a fourth terminals are drawn from two positions in the middle between an innermost portion of the inductor and said first and second terminals, a fifth terminal is drawn from a position in the innermost portion, said first and second terminals are connected to the emitters of the pair of transistors in said low noise amplifying circuit with the low gain, said third and fourth terminals are connected to the emitters of the pair of transistors in said low noise amplifying circuit with the high gain, and said fifth terminal is grounded through a resistance.

11. The wireless communication terminal according to claim 9, wherein:
    said quadrature demodulator has two Gilbert Cell circuits for an I channel and a Q channel, respectively, and a current source for providing a current bias current for each of the Gilbert Cell circuits,
    a first Gilbert Cell circuit has a first differential pair of transistors and a second differential pair of transistors, emitters of the first differential pair of transistors are directly coupled to both said own current source and a collector of one of the pair of low gain transistors in said low noise amplifying circuit with current selectively flowing to said own current source during high gain or to a collector of one of the pair of low gain transistors in said low noise amplifying circuit during low gain, and emitters of the second differential pair of transistors are directly coupled to both said own current source and a collector of the other of the pair of low gain transistors in said low noise amplifying circuit with current selectively flowing to said own current source during high gain or to a collector of the other of the pair of transistors in said low noise amplifying circuit during low gain,
    a second Gilbert Cell circuit has a third differential pair of transistors and a fourth differential pair of transistors, emitters of the third differential pair of transistors are directly coupled to both said own current source and a collector of one of the pair of low gain transistors in said low noise amplifying circuit with current selectively flowing to said own current source during high gain or to a collector of one of the pair of transistors in said low noise amplifying circuit during low gain, and emitters of the fourth differential pair of transistors are directly coupled to both said own current source and a collector of the other of the pair of low gain transistors in said low noise amplifying circuit with current selectively flowing to said own current source during high gain or to a collector of the other of the pair of low gain transistors in said low noise amplifying circuit during low gain, and
    said control means makes said current source for each of said first and second Gilbert Cell circuit active when said low noise amplifying circuit with the high gain operates and inactive when said low noise amplifying circuit with the low gain operates.

12. The wireless communication terminal apparatus according to claim 10, wherein said reception circuit includes an IC chip.

* * * * *

UNITED STATES PATENT AND TRADEMARK OFFICE
CERTIFICATE OF CORRECTION

PATENT NO.         : 7,221,919 B2
APPLICATION NO. : 10/509889
DATED                 : May 22, 2007
INVENTOR(S)        : Kotaro Takagi Page 1 of 1

It is certified that error appears in the above-identified patent and that said Letters Patent is hereby corrected as shown below:

Column 5, line 57, change "a connector" to --a collector--;
        lines 58-59, change "pair of transistors Q9 and Q12" to --pair of transistors Q11 and Q12--;
        line 62, change "transistors Q10 and Q11" to --transistors Q10 and Q9--.
Column 6, line 21, change "transistors Q7 and Q6" to --transistors Q7 and Q8--;
        line 22, change "resistor R10" to --resistor R13--;
        line 23, change "terminal P12" to --terminal P11--;
        line 24, change "transistors Q8 and Q5" to --transistors Q6 and Q5--.

Signed and Sealed this

Twenty-fifth Day of December, 2007

JON W. DUDAS
*Director of the United States Patent and Trademark Office*